United States Patent [19]

Silvestrini et al.

[11] Patent Number: 4,957,043
[45] Date of Patent: Sep. 18, 1990

[54] FRUIT DISINTEGRATING APPARATUS

[75] Inventors: Jesus A. Silvestrini; Jose E. Barbier, both of Mendoza, Argentina

[73] Assignee: IMDEC S.A., Tampa, Fla.

[21] Appl. No.: 331,699

[22] Filed: Mar. 31, 1989

[30] Foreign Application Priority Data

Apr. 26, 1988 [AR] Argentina .............................. 310.677

[51] Int. Cl.$^5$ ......................... A23N 1/00; A23L 1/212
[52] U.S. Cl. ......................................... 99/472; 99/352; 99/471; 99/473; 99/483; 99/510; 99/516; 241/275; 241/DIG. 14
[58] Field of Search ................. 99/352, 471, 477, 472, 99/473, 483, 510, 516, 534, 536, 537, 547, 548, 571; 241/275, 274, DIG. 14; 426/520, 523

[56] References Cited

U.S. PATENT DOCUMENTS

| | | | |
|---|---|---|---|
| 2,516,963 | 8/1950 | Derbenwick et al. | 99/565 |
| 2,529,679 | 11/1950 | Dodds | 241/275 |
| 3,703,861 | 11/1972 | Slack et al. | 99/471 |
| 3,778,521 | 12/1973 | Fisher et al. | 99/516 |
| 3,995,814 | 12/1976 | Alberts | 241/275 |
| 4,138,067 | 2/1979 | Planiol | 241/DIG. 14 |
| 4,379,796 | 4/1983 | Gross | 99/472 |
| 4,515,316 | 5/1985 | Kawaguchi | 241/275 |
| 4,809,595 | 3/1989 | Catelli | 99/510 |
| 4,829,891 | 5/1989 | Satake | 99/516 |
| 4,848,678 | 7/1989 | Iwasaki et al. | 241/DIG. 14 |

FOREIGN PATENT DOCUMENTS 60-41586  9/1985  Japan ..................................... 99/510

Primary Examiner—Timothy F. Simone

[57] ABSTRACT

Apparatus is disclosed for disintegrating fruit into pulp and juice and includes apparatus for controlling the rate of introduction of fruit and of ambient atmosphere into the overall apparatus, a cylindrical rotor housing having an entrance aperture and an outlet channel with a rotor drivingly rotated within to accelerate the fruit around a circular path and then discharge the fruit through a tangential channel into a disintegration chamber where the fruit impacts against a disintegrating member to disintegrate the fruit into pulp and juice for subsequent removal and packing.

13 Claims, 2 Drawing Sheets

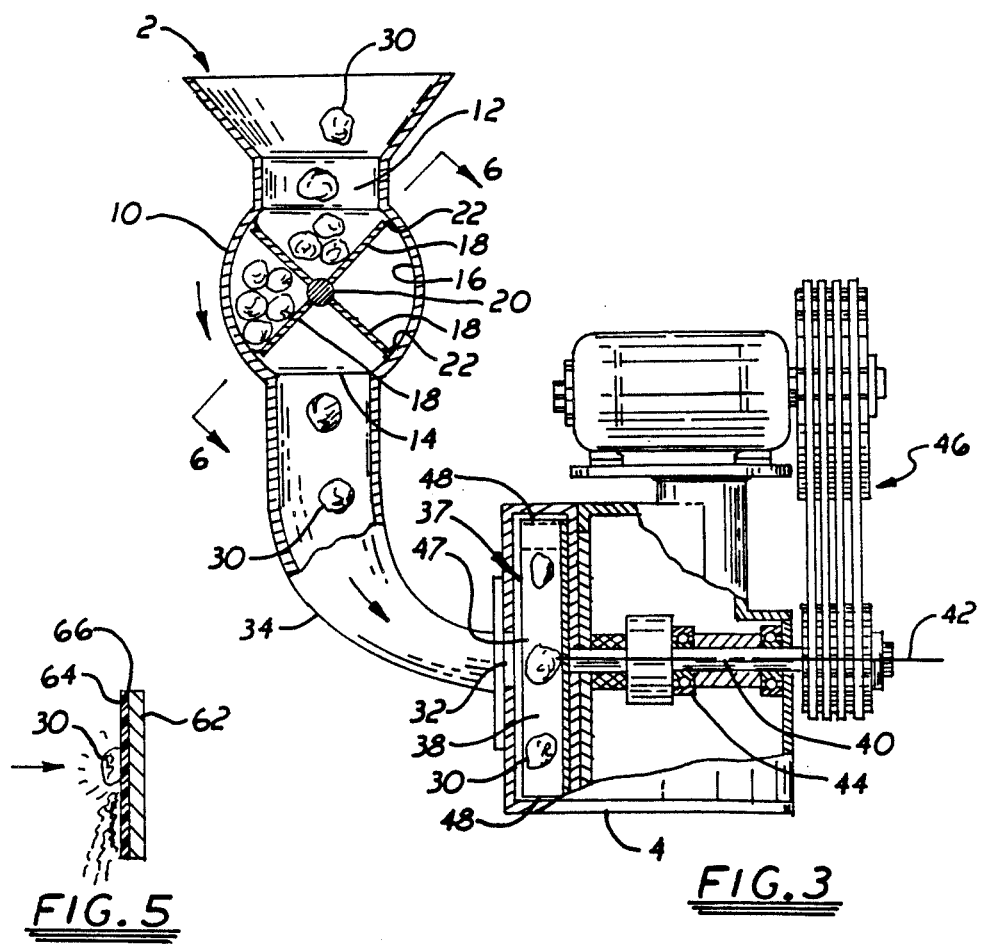
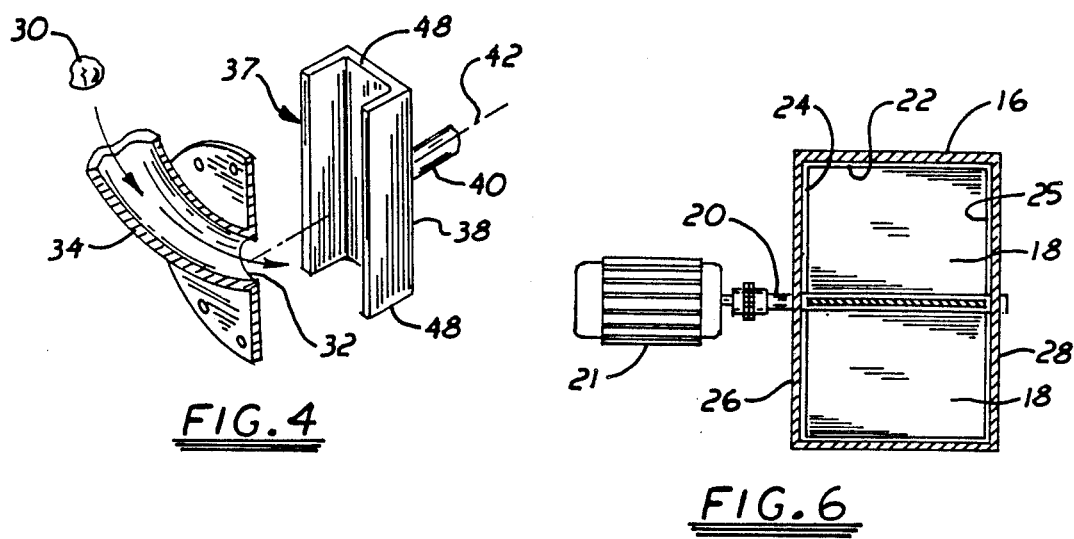
FIG. 5
FIG. 4
FIG. 3
FIG. 6

FRUIT DISINTEGRATING APPARATUS

BACKGROUND OF THE INVENTION

This invention relates to apparatus for treating fruit for packaging. More specifically, it refers to disintegrating apparatus for use with fruit in which a controlled pulverizing of the fruit to obtain pulp and juice for subsequent packaging.

It is known in the food industry that, when separating the pit or seed from the pulp of fruit, particularly before the fruit is cooked, breaking of the pit should be avoided. This is important because a broken pit may contaminate both the aroma and the flavor of the pulp by the action of the substances it contains. Also, in some cases, the pit can be used in other processes in which it is essential that the pit not have undergone heat treatment or cooking. Thus, it becomes important to obtain separation of the pulp and juice of the fruit from the intact pit, particularly where the pulp of fruits of the drupe type, such as peaches and apricots are involved, although the principle can be important with other types of fruit, such as quince and others as well.

Various types of apparatus have been proposed in the past, such as that of U.S. Pat. No. 2,516,963 to Derbenwick et al. in which the fruit is introduced into a rapidly spinning basket with the centrifugal force serving to tear the pulp from the pits of the fruit while the latticework of the basket is spaced appropriately to retain the pits within the basket. However, these and other prior art devices have generally been inefficient in the removal of the pulp from the pit. Additionally, such apparatus has frequently resulted in pulp and juice of lower quality than desired because of enzymatic and oxidation changes occurring during the disintegration process.

SUMMARY OF THE INVENTION

To overcome the foregoing disadvantages of the prior art, it is an object of the present invention to provide an apparatus that can be used for disintegrating or pulverizing a variety of fruit. It is an additional object to provide such an apparatus that makes possible the separation of the pulp of the fruit from its pit without breaking the pit. To obtain these and other advantages that will become apparent to those skilled in the art, this invention provides a fruit disintegrating apparatus for pulverizing fruit into pulp and juice and includes a fruit introducing structure for substantially limiting the rate of introduction of fruit and of ambient atmosphere into the apparatus to a predetermined maximum, a cylindrical rotor housing having an entrance aperture connected to the fruit introducing structure adjacent the cylindrical axis of the rotor housing and having an outlet channel extending generally tangential to the cylindrical sidewall of the rotor housing, a rotor drivingly rotated within the rotor housing about an axis of rotation generally coincident with the rotor cylindrical housing axis, with that rotor having a fruit receiving portion adjacent the housing entrance aperture and having a fruit discharge portion radially spaced therefrom with the fruit discharge portion being closely proximal the housing cylindrical sidewall such that the sidewall blocks discharge of fruit from the rotor except when the fruit discharge portion of the rotor is adjacent the housing outlet channel, whereby fruit carried by the rotor will be discharged through the housing outlet channel generally tangential to the cylindrical sidewall, and a fruit disintegration chamber connected to the outer end of the outlet channel to receive fruit therefrom. This fruit disintegration chamber has a fruit disintegrating member with a fruit impact surface generally normal to the path of fruit moving through the housing outlet channel, whereby fruit moving through the outlet channel will be impelled against the impact surface to disintegrate the fruit into pulp and juice, and also has pulp and juice removal structure for removing the pulp and juice from the fruit disintegration chamber for subsequent packing. In particularly preferred embodiments of the invention there may be provided structure for removing air from within the fruit disintegration chamber, such as by evacuating the chamber or by filling the chamber with steam.

BRIEF DESCRIPTION OF THE DRAWINGS

Preferred embodiments of this invention will be described in detail below in connection with the drawings in which:

FIG. 3 is a sectional elevational view of the apparatus of FIG. 1 taken along line 3—3;

FIG. 4 is a fragmentary perspective view of the fruit impelling rotor and rotor housing entrance of the apparatus of FIG. 1;

FIG. 5 is a sectional elevational view of a second embodiment of the fruit disintegrating member of the apparatus of FIG. 1; and FIG. 6 is a sectional view of the fruit introducing apparatus of this invention, taken along line 6—6 of FIG. 3.

DESCRIPTION OF PREFERRED EMBODIMENT

Figure 1:
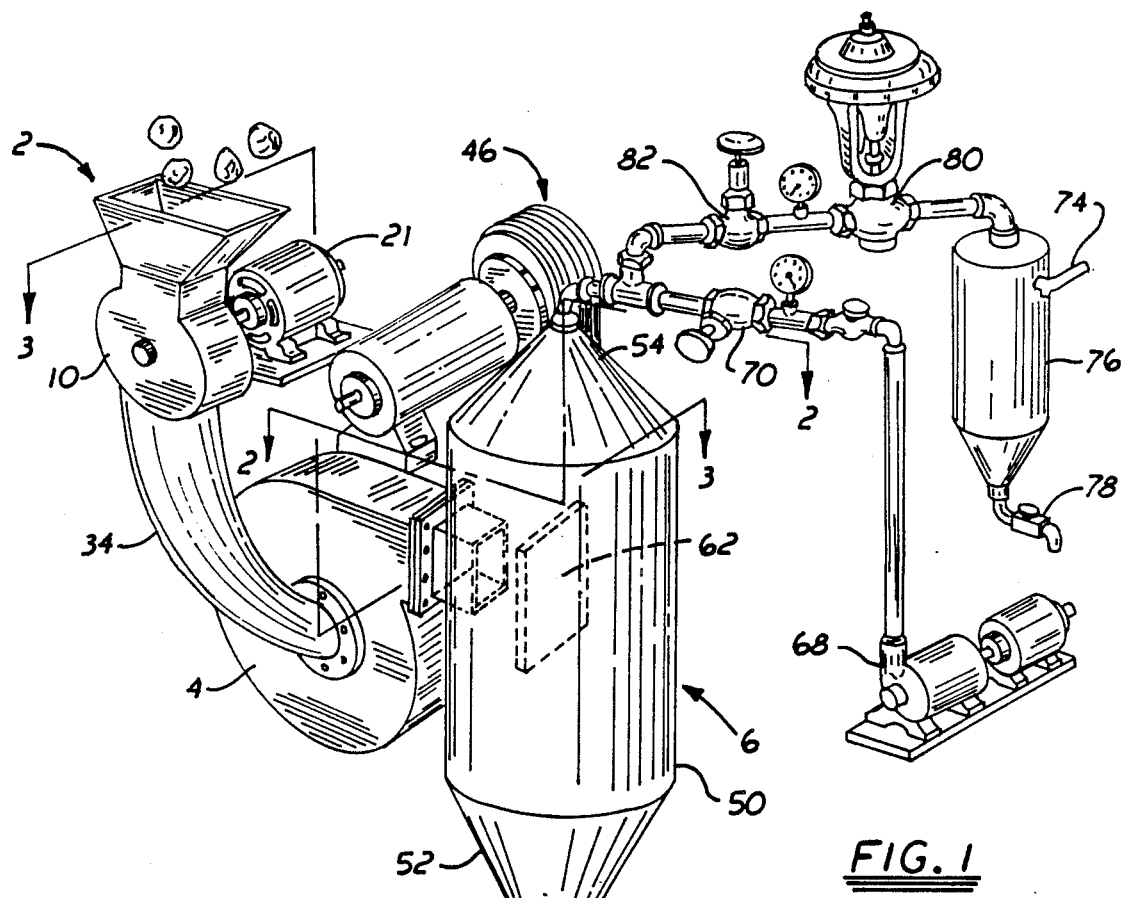
FIG. 1 is a perspective view of one preferred embodiment of the apparatus of this invention.
Figure 2:
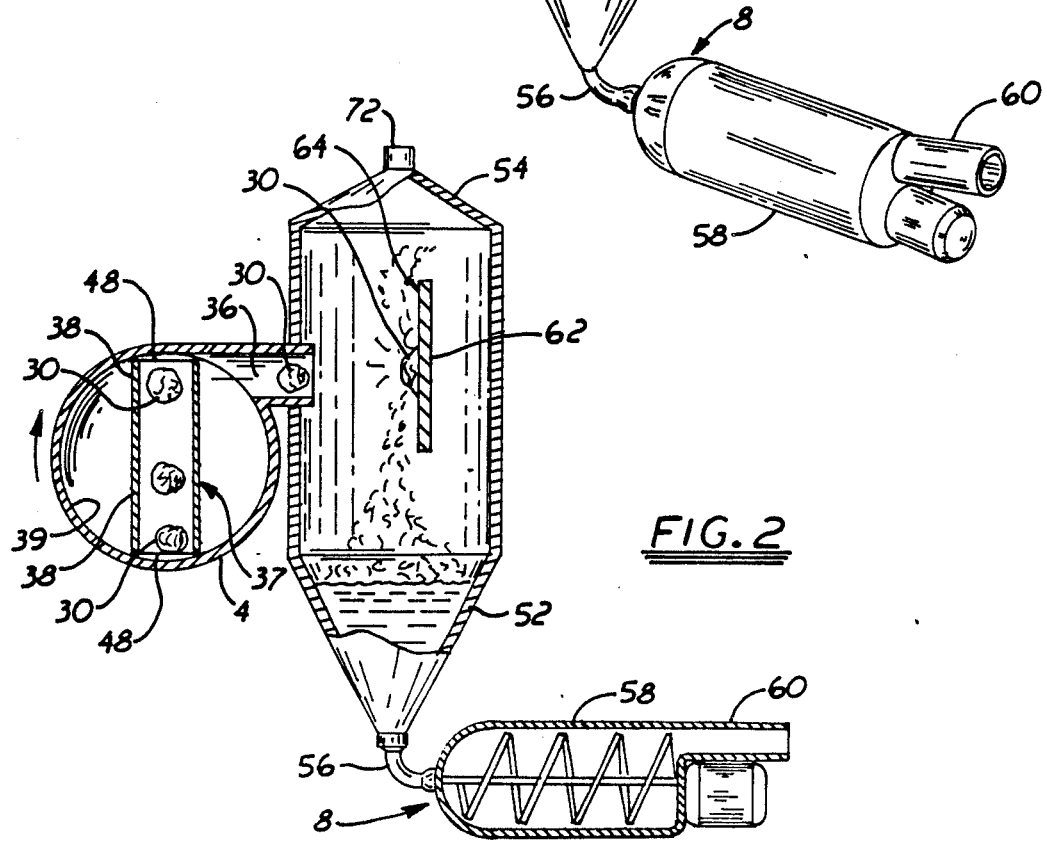
FIG. 2 is a sectional elevational view of the apparatus of FIG. 1 taken along line 2—2.

A particularly preferred embodiment of the apparatus of this invention is illustrated in detail in FIGS. 1 through 3. In FIG. 1 is illustrated the overall apparatus of this embodiment. This apparatus includes, in general, fruit introducing means 2 connected to a generally circularly cylindrical rotor housing 4 which, in turn, is connected to a fruit disintegration chamber 6 which, in turn, is connected to a pulp and juice removal means 8, suitably connected to the lowermost portion of the fruit disintegration chamber 6.

As shown more clearly in the sectional view of FIG. 3, the fruit introducing means 2 includes a generally cylindrical metering housing 10 having a respective entrance aperture 12 and outlet aperture 14 extending through the generally cylindrical sidewall 16 of that housing on generally opposed sides of the cylindrical axis of that housing. Within the housing 10 are a plurality of radially extending metering blades 18, suitably mounted to a central shaft 20 rotating about an axis that is coincident with or identical to the cylindrical axis of the housing 10. This rotation suitably is in the direction indicated by the arrow on FIG. 3 and is driven by a suitable motor 21.

The metering blades 18 are configured such that the radially outer portions 22 thereof are closely proximal the metering housing cylindrical sidewall 16, as shown in FIGS. 3 and 6. Additionally, the axial edges 24 of those blades 18 are closely proximal the axial endwalls 26 and 28 of the metering housing 10, as shown in FIG. 6. By this close proximity, the fruit 3 and also any ambient atmosphere entering the apparatus through the entrance aperture 12 is controlled by the metering blades 18 rotating within the metering housing 10 prior to passage of the fruit 30 through the metering outlet 14. Preferably, the radially outer portions 22 and axial portions 24 and 25 of the metering blades 18 comprise means such as seals for engaging the respectively adjacent portions 16, 26 and 28 of the metering housing 10 to seal the spaces between the metering blades and the metering housing against free flow of ambient atmosphere therethrough to assist in maintaining within the apparatus a pressure differential with respect to the ambient atmosphere. These seals could be any convenient material, such as a relatively rigid polymer of the nature of polyethylene, nylon or the like.

Extending between the outlet 14 of the metering housing 10 and an entrance aperture 32 of the rotor housing 4 is a conduit 34 to conduct the fruit 30 into the rotor housing. As shown in FIGS. 2 and 3 the rotor housing 4 is of generally circularly cylindrical configuration with the entrance aperture 32 being adjacent the cylindrical axis of that rotor housing 4 and an outlet channel 36 extending generally tangential to the cylindrical sidewall 39 of that rotor housing 4. The fruit introducing conduit 34 is connected to that entrance aperture 32 in a manner shown in FIGS. 1 and 2.

Within the rotor housing 4 is a rotor 37, shown in detail in FIGS. 2, 3 and 4. This rotor suitably is carried on a shaft 40 that is generally aligned with the cylindrical axis 42 of the rotor housing 4 and is supported within that housing on suitable bearings 44 and may be driven by a conventional arrangement 46 of a motor, belts and pulleys for rotation about that axis 42. If it is desired to drive the rotor at a variety of speeds, for example, to accommodate the characteristics of different types of fruit, there either may be provided an electronic speed control for the electric motor or a variable speed drive connected to that motor, all of which are conventional.

The rotor 37 itself suitably comprises a member 38 extending diametrically across the rotor housing 4 with a fruit receiving portion 47 generally adjacent the axis 42 and a fruit discharge portion 48 radially spaced from the fruit receiving portion and at the outermost extremity or extremities of that member 38. As shown in FIGS. 2 and 3, the fruit discharge portions 48 of the rotor 37 of this embodiment are closely proximal the housing cylindrical sidewall 38 such that the cylindrical sidewall blocks discharge of fruit from the rotor except when a fruit discharge portion 48 is adjacent the housing outlet channel 36. Thus, fruit carried by the rotor 38 will be discharged from the rotor 37 and the housing 4 through the housing outlet channel 36 generally tangential to the housing cylindrical sidewall 39.

As shown most clearly in FIG. 4, the rotor 37 comprises a member 38 having a generally u-shaped cross section taken normal to a line extending between the fruit receiving portion 47 and the fruit discharge portion 48. By this configuration, fruit received from the housing entrance aperture 32 moves along the channel formed by the u-shaped member 38 from the fruit receiving portion 47 to a fruit discharge portion 48.

The outer end of the fruit discharge channel 36 of the rotor housing 4, which is the end distal the cylindrical portion of that housing, is connected to the fruit disintegration chamber 6 so that that chamber will receive fruit from the rotor housing. This disintegration chamber suitably is in the form of a generally cylindrical housing 50 having a conical lower portion 52 and a flat or conical upper portion 54. Connected suitably to the lowermost portion of that lower conical section 52 are the pulp and juice removal means 8, which conveniently comprise a suitable conduit 56 and an extraction pump 58, which conveniently may be a screw-type pump. The pump 58 includes an outlet 60 to convey the juice and pulp obtained from this apparatus to other appropriate equipment for subsequent packing.

Within the disintegration chamber 6 is mounted a fruit disintegrating member 62 comprising a substantially rigid panel, which may conveniently may be fabricated from a suitable metal and mounted within the chamber 6 by any conventional means. This fruit disintegrating member 62 has a fruit impact surface 64 preferably positioned generally normal to the path of a fruit 30 moving through the housing outlet channel 36. In a manner that will be described in greater detail below, this fruit 30 is hurled by the rotor 38 at sufficient velocity that its impact with the surface 64 of the disintegrating member 62 will serve to disintegrate the fruit into pulp and juice for subsequent packing, which pulp and juice will accumulate in the lower portion 52 of that chamber 6. As shown in FIG. 5, this fruit disintegrating member 62 may, if desired, also include a resilient or soft layer 66 of material, such as an elastomer sheet, to provide a softer or more resilient impact surface 64. This additional layer 66 forming the impact surface 64 will absorb a portion a of the impact energy of the fruit and thus control the degree of disintegration and reduce the likelihood of fracturing of the pit or seed of that fruit.

With the basic structure described above, the operation of the apparatus can now be understood. The operating principle of the apparatus is based primarily upon imparting an acceleration and substantial velocity to bodies, pieces or fruit 30 to cause them to impact substantially perpendicularly to the surface 64 of the stationary member 62 in the disintegration chamber 6. Thus, all the kinetic energy applied to the body is transformed into self-disintegration in the impact between the fruit 30 and the plate 62. While the apparatus is useful for a wide variety of fruit, it is particularly advantageous for separating the intact pit from the pulp and juice of drupaceous fruits, including peaches, apricots, olives, cherries and the like.

As fruit 30 is introduced into the apparatus through the hopper-like entrance into the fruit introducing means 2, the fruit is received within the v-shaped space formed by adjacent metering blades 18 opening upwardly to the entrance aperture 12 of the metering housing 10. This effectively meters or controls the number of fruit introduced into the apparatus with each rotation of the shaft 20 upon which the blades 18 are mounted, thus controlling the rate of introduction of the fruit into the overall apparatus. Also, by virtue of the seal 22 on the radially outer extremities of the blades 18 and seals 24 and 25 on the axial edges of the blades 18 engaging the walls 16, 26 and 28 of that metering housing 10, the ambient atmosphere that is permitted into the overall apparatus may likewise be controlled for purposes of the vacuum or steam environment described below.

Rotation of the shaft 20 and metering blades 18 mounted thereupon thus provides controlled introduction of fruit 30 at a predetermined rate into the conduit 34 extending to the rotor housing 4. As the fruit passes through the entrance aperture 32 of that rotor housing 4 it is received into the fruit receiving portion 47 of the rotor 37, which rotor is being rotatably driven about its axis 42 by the driving mechanism 46. Such rotation urges the fruit 30 radially outwardly toward the fruit discharge portion 48 of the rotor 37 while imparting acceleration to the fruit 30 about the circular path defined by rotation of the rotor. By virtue of the close engagement between the outer end 48 of the rotor and the cylindrical sidewall 39 of the rotor housing 4, the fruit cannot escape from the rotor except when the radially outermost portion 48 of the rotor faces the outlet channel 36 of the rotor housing. At that point the fruit is free to leave the rotor traveling in the direction generally tangential to the cylindrical rotor housing until it impacts against the surface 64 of the disintegrating member 62 mounted within the disintegration chamber 6. The force of the impact of the fruit against the member 62 serves to disintegrate or pulverize the fruit, reducing it to pulp and juice and freeing that pulp and juice from the pit or seeds within the fruit. By gravity the pulp, juice and pit are then collected in the lowermost portion 52 of the chamber 6 and may then be removed by the removal means, including the pump 58 for subsequent packing. Where it is desired to separate the pit from the pulp and juice prior to their removal from the disintegration chamber 6, there may be provided a grate or screen, suitably across the lowermost portion of the cylindrical section 50 of the disintegration chamber 6, with the grate permitting passage therethrough of the pulp and juice but retaining any pits for subsequent removal. Such additional pit removal structure forms no part of the present invention and is not illustrated in the figures.

Because of the large surface area of the fruit exposed to the atmosphere within the disintegration chamber 6 upon disintegration, it may be necessary to take steps to remove air from the chamber 6 to prevent oxidation of the fruit product, as by creating a substantial vacuum within the disintegration chamber 6 or by injecting steam into that chamber to obtain a similar result. To achieve this result, a conventional vacuum pump 68 may be connected through appropriate plumbing, including valve 70, to an opening 72 in the upper portion 54 of the disintegration chamber 6, in the manner generally illustrated in FIG. 1. Through the use of this vacuum pump 68 and the controlling of introduction of ambient atmosphere through the fruit introducing apparatus 10 with the seals on the metering blades 18, described above, air may be substantially removed from within the disintegration chamber 6 to reduce or prevent oxidation of the food product within that chamber. Alternatively, an inert gas such as nitrogen or other known gases might be introduced into the chamber 6 at a pressure greater than ambient to prevent entry of air and thus prevent oxidation.

Another alternative having additional beneficial result is the introduction of heated steam into the disintegrating chamber 6. The apparatus for providing such steam is illustrated in FIG. 1. Suitably, steam from a conventional source is introduced through conduit 74 into a cyclone separator 76 where any undesired elements, such as condensate, dirt or pipe silt or the like may be removed through a trap 78, with the clean steam then passing out through a conduit in the top of the separator 76 through a suitable pressure regulating valve 80 and control valve 82 into the entrance 72 of the disintegrating chamber 6. Of course, during the introduction of such steam, the vacuum pump 68 would be shut off from the system, suitably by the use of valve 70.

By saturating the atmosphere within the disintegration chamber 6 with heated steam, the apparatus not only avoids oxidation of the food product but may also produce almost instantaneous heating in some disintegrated fruit products. This rapid heating occurs because the product is subdivided into very small particles, causing exposure to the steam over a large surface. This exposure thus causes condensation of the steam as the steam imparts to it its latent heat of condensation. This can effect rapid cooking of fruit, such as quince and others, with the additional advantage that any enzymatic changes are inhibited immediately subsequent to the disintegration of the fruit by the impact against the disintegrating member. The steam also tends to inhibit oxidation, thus giving a disintegrated and cooked or heated product of very high quality, which product may then be removed by the pump 58 and sent directly on for packing.

While the foregoing describes several particularly preferred embodiments of the apparatus of this invention, it is to be understood that the description is intended only to be illustrative of the principles of this invention and not to be limitative thereof. Accordingly, because numerous variations and modifications of this apparatus, all within the scope of this invention, will readily occur to those skilled in the art, the invention is to be limited solely by the claims appended hereto.

What is claimed is:

1. Fruit disintegrating apparatus for pulverizing fruit into pulp and juice, comprising fruit introducing means for substantially limiting the rate of introduction of fruit and of ambient atmosphere into said apparatus to a predetermined maximum;

a generally circularly cylindrical rotor housing having an entrance aperture connected to said fruit introducing means adjacent the cylindrical axis of said rotor housing and having an outlet channel extending generally tangential to the cylindrical sidewall of said rotor housing;

a rotor drivingly rotated within said rotor housing about an axis of rotation generally coincident with said rotor cylindrical housing axis, said rotor having a fruit receiving portion adjacent said housing entrance aperture and having a fruit discharge portion radially spaced therefrom with said fruit discharge portion being closely proximal said housing cylindrical sidewall, such that said cylindrical sidewall blocks discharge of fruit from said rotor except when said rotor fruit discharge portion is adjacent said housing outlet channel, whereby fruit carried by said rotor will be discharged from said rotor and said housing through said housing outlet channel generally tangential to said housing cylindrical sidewall; and a fruit disintegration chamber connected to the outer end of said outlet channel to receive fruit therefrom, said chamber having a fruit disintegrating member having a fruit impact surface generally normal to the path of fruit moving through said housing outlet channel, whereby fruit moving through the outlet channel will be impelled against the impact surface to disintegrate the fruit into pulp and juice for subsequent packing and pulp and juice removal means for removing said pulp and juice from said fruit disintegration chamber for subsequent packing.

2. The apparatus of claim 1 wherein said fruit introducing means comprises a generally cylindrical metering housing with respective entrance and outlet apertures through the cylindrical sidewall thereof on generally opposed sides of the cylindrical axis thereof and a plurality of radially extending metering blades rotating about said cylindrical axis with the radially outer portions thereof being closely proximal said metering housing cylindrical sidewall and the axial edges thereof being closely proximal axial endwalls of said metering housing, such that fruit and ambient atmosphere entering the apparatus is controlled by said metering blades rotating within said metering housing prior to passage of said fruit through said metering outlet.

3. The apparatus of claim 2 wherein said metering blades include on their respective radially outer portions and axial edges means for engaging respectively adjacent portions of said metering housing to substantially close the spaces between said metering blades and said metering housing against free flow of ambient atmosphere therethrough to assist in maintaining within said apparatus a pressure differential with respect to the ambient atmosphere.

4. The apparatus of claim 1 wherein said rotor comprises an elongated member extending diametrically across said rotor housing and having a generally u-shaped cross section taken normal to a line extending between said fruit receiving portion and said fruit discharge portion, whereby fruit received from the housing entrance aperture moves along the channel formed by the u-shaped member from the fruit receiving portion to the fruit discharge portion.

5. The apparatus of claim 1 wherein said fruit disintegration chamber further comprises means for substantially removing air from therewithin, whereby oxidation of the pulverized fruit will be slowed.

6. The apparatus of claim 5 wherein said air removing means comprises a vacuum pump connected to said disintegration chamber.

7. The apparatus of claim 5 wherein said air removing means comprises means for filling said disintegration chamber with steam.

8. The apparatus of claim 5 wherein said air removing means comprises means for introducing a non-oxidizing gas into said disintegration chamber at a pressure greater than ambient.

9. The apparatus of claim 1 wherein said fruit disintegrating member comprises a substantially rigid metal panel.

10. The apparatus of claim 9 wherein said fruit disintegrating member further comprises resilient means interposed between said rigid metal panel and a fruit being impelled thereagainst, whereby the impact of the fruit will be cushioned to reduce the likelihood of a pit or seed within the fruit being broken by said impact.

11. The apparatus of claim 1 wherein said fruit disintegration chamber further comprises means for inhibiting enzymatic changes in said fruit immediately subsequent to disintegration thereof by impact against said disintegrating member.

12. The apparatus of claim 11 wherein said enzymatic inhibiting means comprises means for introducing heated steam into said disintegration chamber.

13. The apparatus of claim 1 wherein said pulp and juice removal means comprises an extraction pump connected to said disintegration chamber adjacent the lowermost portion thereof.

* * * * *